US012768485B2

(12) United States Patent
Sterner et al.

(10) Patent No.: US 12,768,485 B2
(45) Date of Patent: Oct. 20, 2026

(54) INVERSION UNIT WITH WINDOW

(71) Applicant: SACPRO AB, Falun (SE)

(72) Inventors: Fredrik Sterner, Falun (SE); Jockum Broden, Gustafs (SE); Fredrik Åhslund, Falun (SE)

(73) Assignee: SACPRO AB, Falun (SE)

( * ) Notice: Subject to any disclaimer, the term of this patent is extended or adjusted under 35 U.S.C. 154(b) by 387 days.

(21) Appl. No.: 18/484,208

(22) Filed: Oct. 10, 2023

(65) Prior Publication Data

US 2024/0240741 A1 Jul. 18, 2024

(30) Foreign Application Priority Data

Jan. 17, 2023 (EP) .................................... 23151944

(51) Int. Cl.

| | |
|---|---|
| ***F16L 55/165*** | (2006.01) |
| ***B65H 75/40*** | (2006.01) |
| ***B65H 75/44*** | (2006.01) |

(52) U.S. Cl.

CPC ........ *F16L 55/1651* (2013.01); *B65H 75/403* (2013.01); *B65H 75/4471* (2013.01)

(58) Field of Classification Search

CPC . B29C 63/36; B29C 67/0018; B65H 2701/33; B65H 75/403; B65H 75/4471; F16L 55/1651; F16L 55/1654; F16L 55/18

See application file for complete search history.

(56) References Cited

U.S. PATENT DOCUMENTS

| | | | | |
|---|---|---|---|---|
| 5,957,318 | A | 9/1999 | Banke et al. | |
| 6,733,053 | B2 * | 5/2004 | Hodge | E05B 65/006 292/285 |
| 2019/0063662 | A1 * | 2/2019 | Noggle | F16L 55/18 |
| 2020/0263821 | A1 * | 8/2020 | Sterner | F16L 55/18 |

* cited by examiner

*Primary Examiner* — Dominick L Plakkoottam

(74) *Attorney, Agent, or Firm* — Foley & Lardner LLP

(57) ABSTRACT

An inversion unit includes: a housing, a reel for a liner partially arranged in the housing, and a base assembly, the housing being arranged on the base assembly. The housing includes: a gas inlet, an outlet for the liner, an opening including a window, and a bayonet catch for closing and opening the window, the bayonet catch configured to be maneuvered into an open position in which the window is open and unlocked and a closed position in which the window is closed and locked. The bayonet catch includes: a motion link assembly, a projection assembly configured to engage with the motion link assembly, a handle, and a hinge. The handle is pivotably connected to the hinge.

11 Claims, 3 Drawing Sheets

INVERSION UNIT WITH WINDOW

TECHNICAL FIELD

The invention relates to the field of inversion units for pipe-relining and in particular to an inversion unit having a window that is easy to handle, in particular open and close.

BACKGROUND OF THE INVENTION

Inversion units are used to refurbish piping and plumbing systems in buildings and structures. The inversion units allow to reline pipes instead of removing old pipes and installing new pipes and therewith allow to provide for a smoother and quicker process of refurbishing piping and plumbing system. For relining, a sleeve made of fabric that is impregnated with a resin prior to rolling the sleeve up on a reel of an inversion unit. The reel is typically enclosed by a drum that is designed to be airtight when the sleeve is connected to an adapter for entering the piping system. Once the impregnated fabric is connected to the adapter and therewith ready to enter a pipe, the drum is pressurized with a gas, typically air, via a gas inlet. Due to the pressure in the drum and the connection to the adapter, the impregnated fabric is entering the pipe in an inverted manner. The inverted and impregnated fabric will therewith seal the piping once it is installed and cured.

In order to observe that everything is running smooth and that no problems occur a window is typically provided on the drum as shown for instance in the US 2020/0263821 A1. An opening formed in the drum, which opening is covered by the window is used so that the workers can reach into the drum to perform manual work in case of issues in the drum during operation or during reeling up of the impregnated fabric. The window in the US 2020/0263821 A1 is a lock that is screwed onto a thread of the opening of the drum. The size of the window in the US 2020/0263821 A1 is limited and the opening and the closing of the window takes time due to the screwing movement that is required.

The present invention seeks to provide a larger window having a smooth and reliable locking mechanism.

SUMMARY OF THE INVENTION

An object of the present invention is to provide an inversion unit that is easy to handle and provides for an efficient work process.

In view of the above-mentioned problems the inventor of the present invention has discovered that it is possible to change the design of the window on the housing or drum of the inversion unit for better and smoother access to the window by using a bayonet mechanism in combination with a handle.

Disclosed herein is a inversion unit comprising a housing, a reel for a liner partially arranged in the housing, and a base assembly. The housing is arranged on the base assembly, said housing comprising a gas inlet, an outlet for the liner, an opening comprising a window and a window locking mechanism being designed to be maneuvered into an open position in which the window is open and/or unlocked and a closed position in which the window is closed and/or locked, The window locking mechanism is designed as a bayonet catch and comprises a motion link assembly and a matching projection assembly. The window locking mechanism further comprises a handle and a hinge, the handle being pivotably connected to the hinge wherein one of the motion link assembly or the matching projection assembly is arranged on the window and the other of the matching projection assembly or the motion link assembly is arranged on an edge of the opening. The hinge is arranged on the housing and the handle is pivotably connected to the window so that the window can be easily opened and closed in a bayonet catch manner using the handle.

The above-described inversion unit improves the handling of the window using an efficient opening and closing mechanism embodied as the window locking mechanism.

The above-described embodiment of the inversion unit further also covers the kinematic reversed arrangement of the motion link assembly and the matching projection assembly. This means that the motion link assembly may either be arranged on an edge of the opening and the matching projection assembly on the window or the other way around. Both variants work and are herewith covered with the claims presented herein.

In an embodiment the window comprises a seal that is designed to seal the opening when the window locking mechanism is in the closed position.

The seal allows to build up the gas pressure in the housing via the gas inlet in a controlled manner by sealing the inside of the housing.

The opening may be larger than the outlet for the liner. This improves access to the inside of the housing and therewith the access to the part of the reel that is arranged in the housing.

In an embodiment the handle is designed as a lever that can be moved towards the housing for manoeuvring the window locking mechanism into the closed position and that can be moved away from the housing for manoeuvring the window locking mechanism into the open position.

The handle in the form of a lever makes it very easy for an operator or worker to open and close the window using the window locking mechanism.

In another embodiment the window can be rotated or pivoted away from the opening when the window locking mechanism is in its open position.

The above means that the window can be moved out of the way when the window locking mechanism is in its open position.

In another embodiment the opening may be substantially rectangular. This may allow to use standard components for the window and frame.

In still a further embodiment the housing may comprise a gas outlet for better controlling the gas pressure in the housing.

In an embodiment the base assembly can be disconnected from the housing and wherein the base assembly comprises a base and wheels.

The disconnection of the inversion unit from the base assembly may improve the handling of the inversion unit in tight space(s).

Using wheels connected to the base may improve mobility of the inversion unit and base assembly, respectively.

The base assembly may further be provided with at least one swivelling wheel, which further improves the handling of the inversion unit and base assembly, respectively.

In an embodiment the window further comprises a glass and a frame embedding the glass of the window, said frame being pivotably connected to the handle and said frame comprising the motion link assembly or matching projection assembly.

The above may further improve the robustness of the window and the window locking mechanism. The frame may for example be clamped to the glass and the frame may be made of metal or the like whereby the motion link assembly and the matching projection assembly, respectively, may be integrally formed with the frame.

In still another embodiment the motion link assembly may be arranged in a first plane that is oriented perpendicular to a second plane defined by the window and wherein the matching projection assembly is projecting in a direction perpendicular to the first plane.

The direction of the motion link of the motion link assembly is further oriented so that the window can slide in a linear motion once the handle is operated.

The motion link assembly may comprise two to eight motion link elements, preferably four motion link elements. The motion link elements may be distributed equally on either side of the opening or window while the matching projecting assembly may comprise an equal amount of projections, which are equally distributed so that they match the motion link elements when the window is connected to the opening and when the window locking mechanism is moved into the closed position.

Further aspects and example embodiments are illustrated in the accompanying drawings and/or described in the following description.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
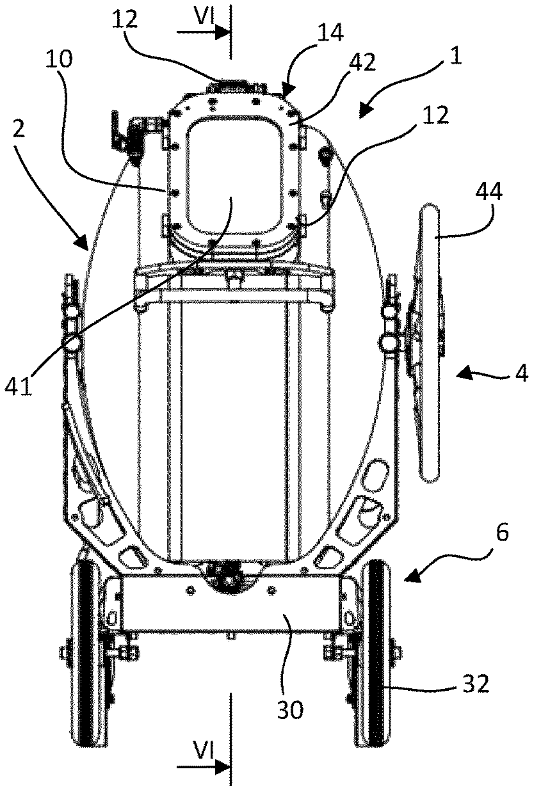
FIG. 1 schematically illustrates a back view of an inversion unit according to the invention.
Figure 2:
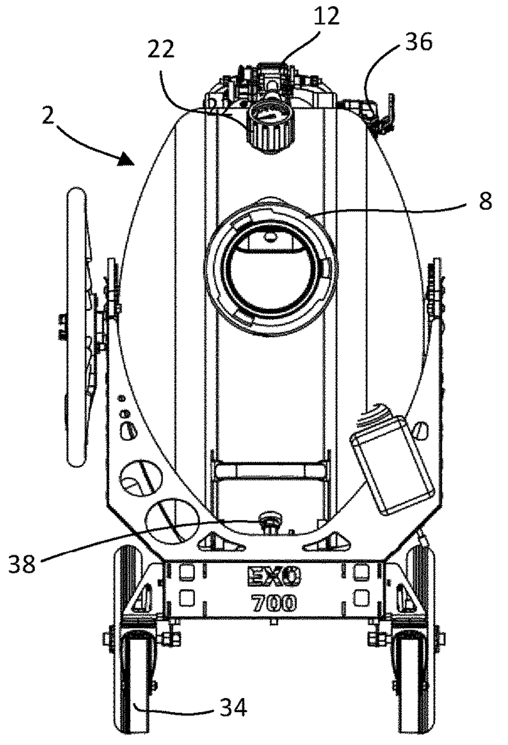
FIG. 2 schematically illustrates a front view of the inversion unit according to FIG. 1.

FIG. 1 illustrates an inversion unit 1 comprising a housing 2, a reel 4 for a liner arranged partially within the housing 2 and a base assembly 6. The housing 2 is formed as a drum but it may be formed as a hexagon, octagon, or any other suitable shape. The reel 4 comprises a manual wheel 44 that can be operated manually by a worker, for example during initial set up of the relining using the inversion unit 1, and an inner reel 46, which is illustrated later on referring to FIG. 6. The base assembly 6 comprises a base 30 and wheels 32, 34 whereby at least some of the wheels 32, 34 are swivelling wheels 34 (c.f. FIG. 2). The housing 2 comprises an opening 10 coverable by a window 14. The window 14 comprises a frame 42, glass 41 and a seal (not visible). The window 14 is kept in place by a window locking mechanism 12. The window locking mechanism 12 is used to open and close the window 14 in a safe and secure manner. The window locking mechanism 12 can be moved from an open position to a closed position and back.

Turning now to FIG. 2 another view of the inversion unit 1 is shown where the housing 2 and an outlet 8 of the housing 2 is well visible. The outlet 8 is used to dispense an impregnated liner (not shown) in an inverted manner into a pipe in order to reline the pipe. The impregnated liner is thereby rolled up onto the reel 4 prior to installation and then dispensed via the outlet 8 using air pressure that is provided inside the housing 2 via a gas inlet 36. The housing 2 further comprises a pressure sensor 22 and a gas outlet 38. Referring to FIGS. 3*a* to 5*b* the window locking mechanism 12 is herewith further explained in more detail.

Figure 3A:
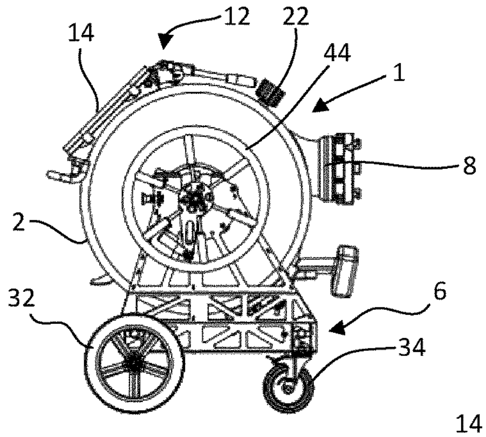
FIG. 3*a* schematically illustrates a side view of the inversion unit of FIG. 1 or 2 with a window locking mechanism in a closed position.
Figure 3B:
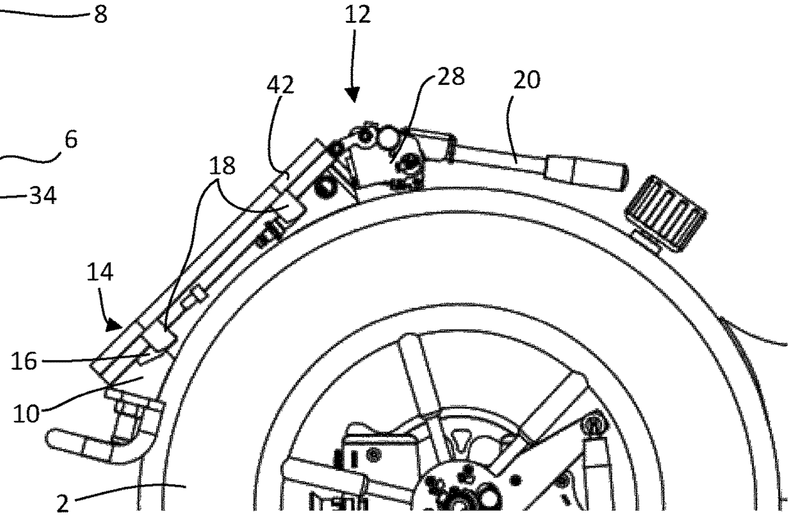
FIG. 3*b* schematically illustrates an enlargement of a detail of FIG. 3*a;*

The window locking mechanism 12 is designed as a bayonet catch and is shown in its closed position in FIGS. 3*a* and 3*b*. FIG. 3*a* illustrates the inversion unit 1 shown in a side view with the outlet 8 and the manual wheel 44 well visible. The pressure sensor 22 and the window locking mechanism 12 are also well illustrated and in the closed position. The closed position of the window locking mechanism 12 is the typical situation during dispensing of the impregnated liner (not shown). In case there is an issue the window 14 can be opened via the window locking mechanism 12 and the inside of the housing 2 can be accessed. The wheels 32 and the swivelling wheels 34 of the base assembly 6 are also well visible. FIG. 3*b* illustrates an enlargement of FIG. 3*a* and the window locking mechanism 12 is herewith explained in more detail referring to FIG. 3*b*.

The window locking mechanism 12 comprises a motion link assembly 16 arranged at an opening 10 of the housing 2, a matching projection assembly 18 arranged on the frame 42 of the window 14 and a handle 20. The motion link assembly 16 comprises guides and a matching projection assembly 18, which comprises projections that are designed to be embedded slideably in the guides of the motion link assembly 16. The motion link assembly 16 and the matching projection assembly 18 are working as a bayonet catch. The handle 20 in the form of a lever is connected to a hinge 28, which hinge 28 is connected to the housing 2 or an edge of the opening 10. The hinge 28 is further pivotably connected to the frame 42 of the window 14. In the closed position of the viewing locking mechanism 12 the lever 20 is arranged close to the housing 2.

Figure 4A:
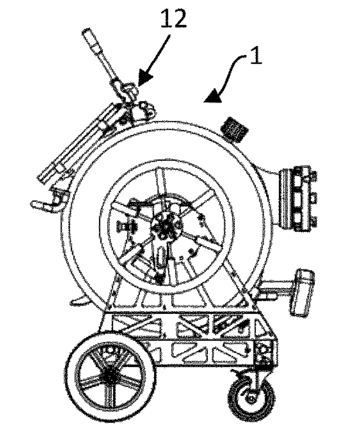
FIG. 4*a* schematically illustrates another side view of the inversion unit of FIGS. 1 and 2 with the window locking mechanism in an unlocked position.
Figure 4B:
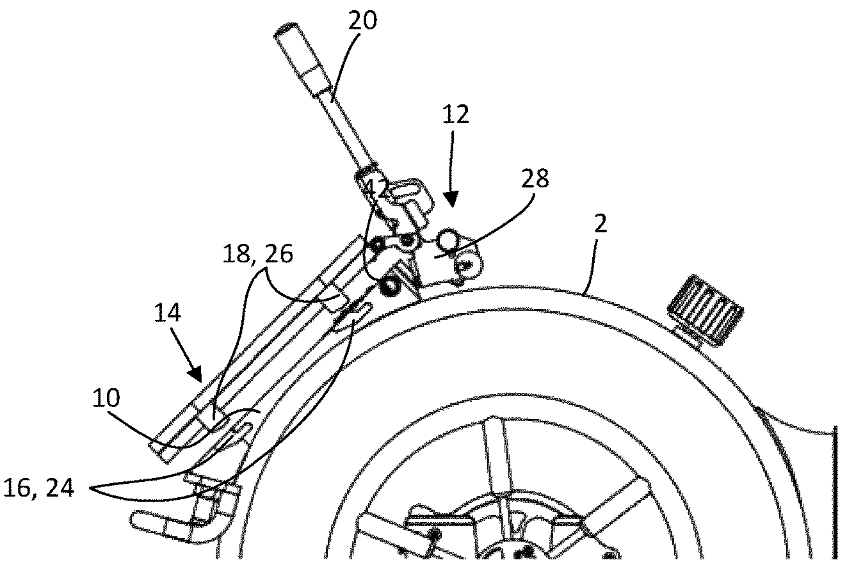
FIG. 4*b* schematically illustrates an enlargement of a detail of FIG. 4*a;*

Turning now to FIGS. 4*a* and 4*b* an unlocked position of the window locking mechanism 12 is herewith explained and illustrated. In the unlocked position the lever 20 or handle 20 is moved upwards and away from the housing 2 via the hinge 28. This frees the window 14 and the matching projection assembly 18 with projections 26, respectively, from the motion link assembly 16 with its motion link elements 24 arranged on the opening 10 and therewith unlocking the window 14.

An unlocked window 14 allows a worker to pivot the window 14 out of the way so that the inner room or inside of the housing 2 can be easily accessed. This is shown in FIGS. 5*a* and 5*b*.

Figure 5A:
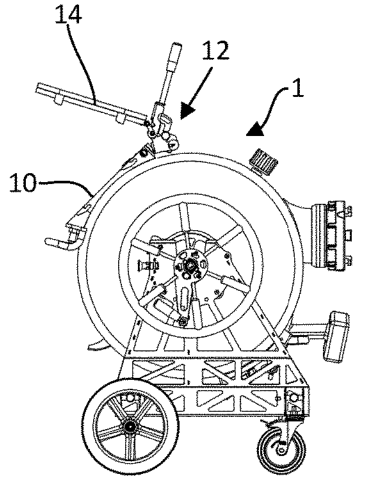
FIG. 5*a* schematically illustrates another side view of the inversion unit according to FIGS. 1 and 2, with the window locking mechanism in an open position.
Figure 5B:
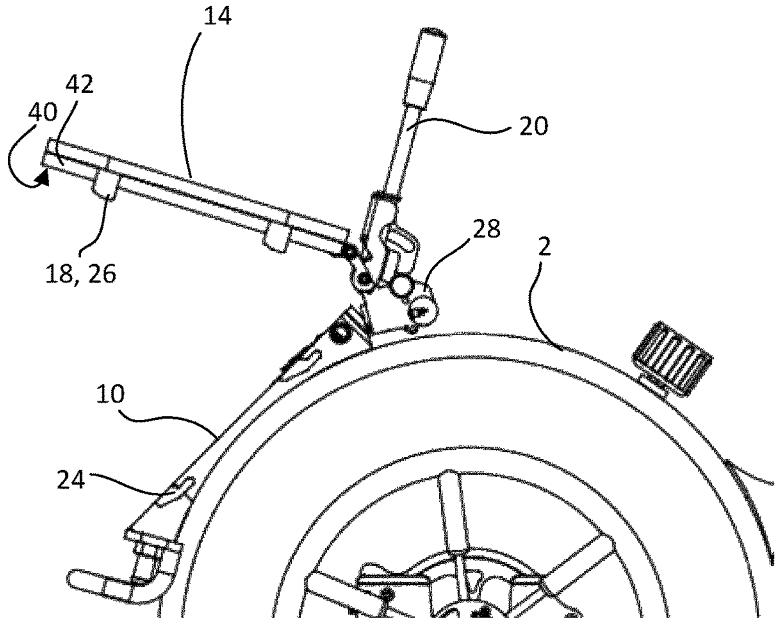
FIG. 5*b* schematically illustrates an enlargement of a detail FIG. 5*a*.

FIGS. 5*a* and 5*b* illustrate the window 14 pivoted or swivelled away from the opening 10. This leaves the four motion link elements 24 well visible. It can be seen that these motion link elements 24 comprise an entry gap where the projections 26 of the matching projection assembly 18 can enter a motion link or guide rail of the motion link elements 24 for a form-fit locking when the window 14 is maneuvered into the corresponding position and when the lever 20 is moved towards the housing 2. A seal 40 may be arranged on the window 14 so that the inside of the housing 2 is properly sealed off once the window 14 and the window locking mechanism 12 is in the closed position (c.f. FIGS. 3*a* and 3*b*). The hinge 28 may be fixed to the opening 10 or it may be fixed to the housing 2.

Figure 6:
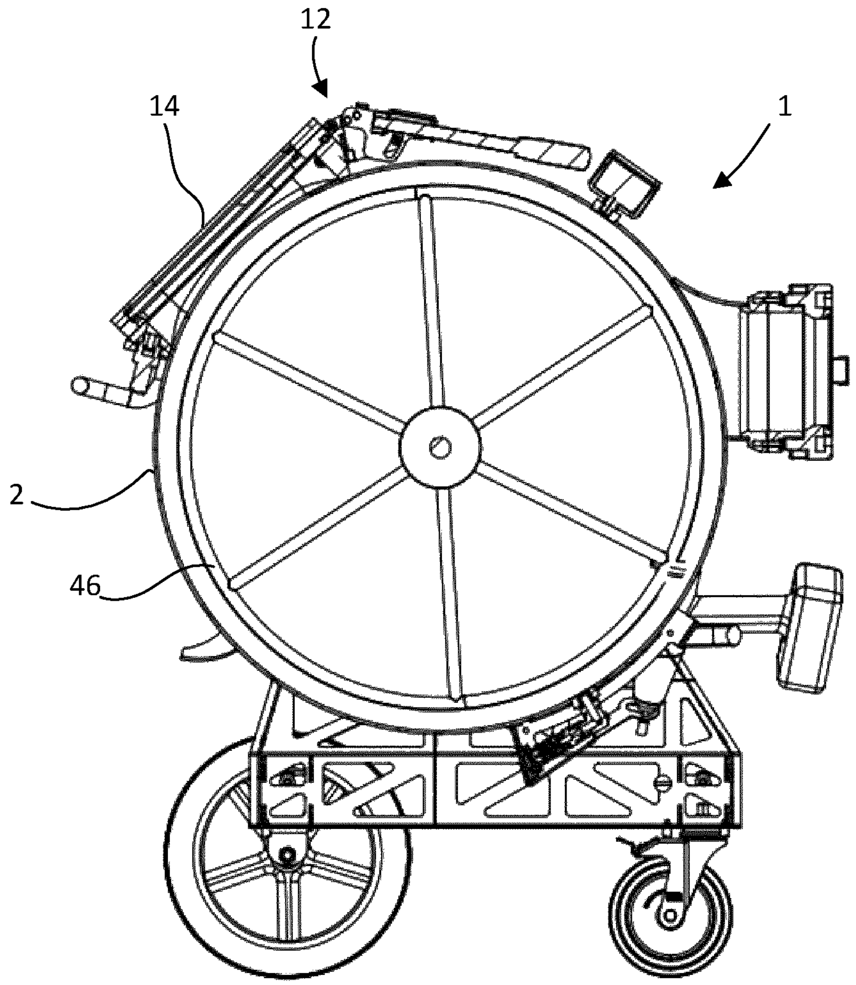
FIG. 6 schematically illustrates a cross sectional view of the inversion unit, cut along plane VI-VI of FIG. 1.

Turning now to FIG. 6 a cross-sectional view of the inversion unit 1 cut through line VI-VI of FIG. 1. FIG. 6 illustrates an inner space of the housing 2 in which inner space the inner reel 46 is arranged.

The invention has now been described referring to an embodiment according to the FIGS. 1 to 6. It is however possible to change and vary some aspects of the invention and still fall within the general idea disclosed herein.

The unlocked position and the open position of the window locking mechanism may be regarded as the same, both positions; the unlocked and open position relate to positions in which the window 14 can be moved out of the way so that the inside of the housing can be accessed.

The hinge 28 may be connected to an edge of the opening 10 or the housing 2 and it may be fixedly and rigidly connected to one or both of the edge of the opening 10 and the housing 2.

The above used term bayonet catch may refer to a bayonet mechanism or a bayonet lock.

Further the motion link assembly 16 is shown to have four motion link elements 24, two on each side of the opening 10, and the matching projection assembly 26 has likewise four projections 26, two on each side of the opening 10. Any other symmetric or non-symmetric disposition of projections and motion links may however be used and considered feasible for the invention as explained above.

Preferably the motion link assembly 16 and in particular the guide rails of the motion link assembly 16 may be arranged in a first plane that is oriented perpendicular to a second plane defined by the window 14. The matching projection assembly 18 is projecting in a direction perpendicular to the first plane so that the projections 26 can engage in the motion links 24 upon movement of the handle 20 of the window locking mechanism 12.

Unless the explanation unambiguously requires otherwise, throughout the description and the claims the following terms have the following explained meaning and limitations:

- “comprise”, “comprising”, and the like are to be construed in an inclusive sense, as opposed to an exclusive or exhaustive sense, which means they are to be interpreted in the sense of “including, but not limited to”;
- “arranged”, or any variant thereof, means that the device, element or feature is either rotatably, fixedly, slideably or removably connected to another element or simply “designed” to perform a function as it is described, the term “arranged” and “designed” are therewith to be interpreted in a wide and inclusive way;
- “coupled”, “connected”, or any variant thereof, means any connection or coupling, either direct or indirect, between two or more elements; the coupling or connection between the elements can be physical, logical, electrical or a combination thereof;
- “herewith”, “herein”, “above”, “below”, and words of similar import, when used to describe this specification, shall refer to this specification as a whole, and not to any particular portions of this specification;
- “or” and “and/or”, in reference to a list of two or more items, covers all of the following interpretations of the word: any of the items in the list, all of the items in the list, and any combination of the items in the list;
- the singular forms “a”, “an”, and “the” also include the meaning of any appropriate plural forms.

Words that indicate directions such as “inside”, “plane”, “vertical”, “transverse”, “horizontal”, “upward”, “downward”, “forward”, “backward”, “inward”, “outward”, “vertical”, “transverse”, “left”, “right”, “front”, “back”, “top”, “bottom”, “below”, “above”, “under”, and the like, used in this description and any accompanying claims (where present), depend on the specific orientation of the inversion unit or device described and illustrated. If a “plane” is described to be defined by a flat planar object such as a window or glass plate it means that such a “plane” is oriented parallel to such a flat planar object as the window or glass plate. The subject matter described herein may assume various alternative orientations. Accordingly, these directional terms are not strictly defined and should not be interpreted narrowly.

The invention claimed is:

1. An inversion unit comprising:
   a housing,
   a reel for a liner partially arranged in the housing, and
   a base assembly, the housing being arranged on the base assembly, wherein:
   said housing comprises:
      a gas inlet,
      an outlet for the liner,
      an opening comprising a window, and
      a bayonet catch for closing and opening the window, said bayonet catch configured to be maneuvered into an open position in which the window is open and unlocked and a closed position in which the window is closed and locked,
   the bayonet catch comprises:
      a motion link assembly,
      a projection assembly configured to engage with the motion link assembly,
      a handle, and
      a hinge, wherein:
      the handle is pivotably connected to the hinge,
      one of the motion link assembly or the projection assembly is arranged on the window and the other of the projection assembly or the motion link assembly is arranged on an edge of the opening,
      the hinge is arranged on the housing,
      the handle is pivotably connected to the window so that the window can be opened and closed in a bayonet catch manner using the handle, and
      the motion link assembly comprises guides oriented so that the window slides in a linear motion relative to the housing when the handle is operated.

2. The inversion unit according to claim 1, wherein the window comprises a seal configured to seal the opening when the bayonet catch is in the closed position.

3. The inversion unit according to claim 1, wherein the opening is larger than the outlet for the liner.

4. The inversion unit according to claim 1, wherein the handle is a lever configured to be moved towards the housing for maneuvering the bayonet catch into the closed position and configured to be moved away from the housing for maneuvering the bayonet catch into the open position.

5. The inversion unit according to claim 1, wherein the window is configured to be rotated away from the opening when the bayonet catch is in the open position.

6. The inversion unit according to claim 1, wherein the opening is substantially rectangular.

7. The inversion unit according to claim 1, wherein the housing further comprises a gas outlet.

8. The inversion unit according to claim 1, wherein the base assembly is configured to be disconnected from the housing, and wherein the base assembly comprises a base and wheels.

9. The inversion unit according to claim 8, wherein the base assembly further comprises at least one swivelling wheel.

10. The inversion unit according to claim 1, wherein the window further comprises a glass, and a frame embedding the glass of the window, said frame being pivotably connected to the handle, and said frame comprising the motion link assembly or the projection assembly.

11. The inversion unit according to claim 1, wherein the motion link assembly is arranged in a first plane that is oriented perpendicular to a second plane defined by the window, and wherein the projection assembly projects in a direction perpendicular to the first plane.

* * * * *